Patented Aug. 2, 1932

1,869,668

UNITED STATES PATENT OFFICE

ARNOLD M. COLLINS, OF WILMINGTON, DELAWARE, ASSIGNOR TO E. I. DU PONT DE NEMOURS & COMPANY, OF WILMINGTON, DELAWARE, A CORPORATION OF DELAWARE

SYNTHETIC DRYING OILS AND PROCESS OF MAKING THEM

No Drawing. Original application filed August 7, 1929, Serial No. 384,238. Divided and this application filed June 16, 1931. Serial No. 544,931.

This invention relates to the art of drying oils and, more particularly, to synthetic drying oils and the process of making them.

Although drying oils, such as linseed and China wood oil, and varnishes made from them, yield films of excellent flexibility, adhesion, durability, and resistance to the action of water, these oils and varnishes dry and harden too slowly to be advantageously used for many purposes where speed is an important consideration. Accordingly, they are being replaced, to some extent, by nitrocellulose lacquers which, however, have the disadvantage of being more costly. Furthermore, since the drying oils now known are all derived from vegetable or animal products, many of which are brought from foreign countries, their cost and availability are subject to considerable variation.

I have found that highly unsaturated hydrocarbons, such as divinyl acetylene, may be polymerized to form liquid, non-volatile products which have the general characteristics of drying oil but possess numerous advantages thereover, and may be used to form coating compositions which are superior to those heretofore in use.

It is therefore an object of my invention to provide synthetic drying oils.

It is another object of my invention to provide drying oils having better drying and hardening properties and more resistant than those heretofore available.

It is a further object of my invention to provide a process of making drying oils.

With the above and other objects in view, which will be apparent as the description proceeds, I have set forth my invention in the following specification and have included the following examples by way of illustration and not as a limitation.

Example 1

1000 grams of pure divinyl acetylene is boiled at atmospheric pressure and in the presence of air for 4 hours in a vessel provided with a condenser for the return of the condensed vapors to the reaction. The temperature of the boiling liquid is between 85° and 90° C. At the end of 4 hours the unchanged divinyl acetylene is distilled off under reduced pressure. There remains, in 12 to 18% yield, a viscous nonvolatile residue having the general properties of a bodied drying oil and consisting of the polymerized divinyl acetylene. This may be thinned to a viscosity suitable for application by brushing, spraying, etc. by the addition of solvent naphtha.

Example 2

1000 grams of pure divinyl acetylene is boiled as in Example 1, except that 20 grams of cobalt linoleate containing 10% of cobalt is added and the heating last only 2 hours. The unchanged divinyl acetylene is removed as above and the viscous residue, amounting to 12% of the original material, is thinned as in Example 1.

Example 3

1000 grams of pure divinyl acetylene is boiled as in Example 1, except that it is mixed with 1000 grams of xylene and refluxed for 24 hours at 85–90° C. After distilling off the unchanged divinyl acetylene and part of the xylene under reduced pressure there is obtained a 25% yield based on the original divinyl acetylene.

Example 4

A tetramer of acetylene, prepared as indicated below, is heated at atmospheric pressure in a closed vessel at 100° C. for 3 hours or until its refractive index (measured at 25° C. with the D line of the spectrum) is approximately 1.578. A practically non-volatile yellow liquid results which is thin enough and has very desirable drying properties for application as a lacquer or varnish by the usual methods. The yield is about 100%.

Example 5

40 grams of dibutylamine, 1000 grams of crude divinyl acetylene containing about 40% of a tetramer of acetylene, and 1000 grams of xylene are boiled at atmospheric pressure under a reflux condenser for 50 hours, the air in the apparatus being replaced by nitrogen. In this way practically complete conversion into film-forming polymers is effected. The product is a clear reddish orange liquid of relatively low viscosity and having good drying properties, and usually requires no thinning before use.

Example 6

1000 grams of crude divinyl acetylene containing 25% of a tetramer of acetylene is boiled at 75–80° C., at atmospheric pressure, under a reflux condenser and in an atmosphere of nitrogen for 5 hours. The resulting solution of polymers in unchanged hydrocarbons is used as a drying oil after distilling off any unchanged portion of the original material in vacuo, or it is treated as follows: 1000 grams of xylene is added and the mixture is subjected to fractional distillation in vacuo. The unchanged portion of the original material may thus be almost completely removed, leaving most of the xylene behind as a solvent for the resulting synthetic drying oil. This solution is similar to that obtained according to Example 5, but is much lighter in color. The yield is approximately 50% based on the original acetylene mixture and this yield is independent of the optional treatment with xylene.

Example 7

78 grams of divinyl acetylene is hydrogenated in the usual manner with 44.8 liters of hydrogen in the presence of a platinum catalyst. The resulting mixture of unsaturated hydrocarbons is polymerized by heating in a sealed tube for 3 hours at 180° C. After the removal of the unchanged hydrocarbons by vacuum distillation a viscous oil, similar to that obtained in Example 1, is obtained.

The divinyl acetylene referred to above is preferably prepared by mixing 945 parts by weight of ammonium chloride, 1000 parts by weight of water, 2850 parts by weight of cuprous chloride, and 100 parts by weight of copper powder, and agitating this mixture thoroughly while passing into its acetylene gas. When the reaction slows up, as shown by a decrease in the rate of absorption of acetylene, the operation is discontinued, and the highly unsaturated hydrocarbon product formed is obtained by distillation, which is stopped when the condensed hydrocarbon is mixed with much water. The water is separated and returned to the reaction mass which, after cooling, is ready for the absorption of more acetylene. It is preferable, although not essential, to keep the reaction temperature at approximately 25° C. by suitable cooling of the reaction mass.

In the preparation of divinyl acetylene by the method indicated above the resulting product contains a tetramer of acetylene in amounts of from 25–40%, the higher amounts of the tetramer being obtained when part of the divinyl acetylene is removed by distillation. I have found that the presence of the tetramer, which is believed to be butadienyl vinyl acetylene, is desirable inasmuch as it increases the yield of synthetic drying oil.

Although the above examples are limited to the use of divinyl acetylene and a tetramer of acetylene, and reduction products of divinyl acetylene, other unsaturated hydrocarbons, such as other polymerizable polymers of acetylene and other partial reduction products containing at least two and preferably three unsaturated bonds, or the homologs or isomers of these compounds, may be used. Thus, I may employ such compounds as butadiene and its homologs dimethyl butadiene, isoprene, piperylene, and the like as well as compounds of the type of dipropargyl, which contain triple bonds but no double bonds. Furthermore, it is not necessary to use pure compounds in making the synthetic drying oils. In fact, as indicated above, it is sometimes advantageous to polymerize mixtures of unsaturated hydrocarbons. Thus, as indicated above, I may first partially hydrogenate divinyl acetylene to a mixture containing such compounds as divinyl ethylene, vinyl ethyl ethylene, and vinyl ethyl acetylene, and then polymerize this mixture. The hydrocarbons discussed in this paragraph will be referred to generally as polymerizable aliphatic hydrocarbons containing at least two and preferably three unsaturated bonds.

These unsaturated hydrocarbons may be polymerized at any temperature below that at which decomposition occurs, but, in general, I have found a temperature between 80° and 100° C. to be the most suitable for divinyl acetylene and a tetramer of acetylene. For more nearly saturated compounds higher temperatures are preferable. Heating may be continued to any point short of the formation of an insoluble gel, at which time any remaining unchanged hydrocarbon is distilled off. The synthetic drying oils obtained are more or less viscous liquids, non-volatile at ordinary temperatures and consist of compounds containing at least 12 carbon atoms and having a molecular weight of at least 156. The rate of polymerization varies with the type of unsaturated hydrocarbon used, and may be increased by increasing the temperature, or by the presence of oxygen with or without those substances known to the varnish art as driers. It may be decreased, on the other hand, by decreasing the temperature, by dilution with solvents, and by the addition of antioxidants in relatively small amounts. The yield of polymerized material obtainable before gelation occurs is increased by the use of solvents, such as aromatic hydrocarbons, peptizing agents, such as aliphatic amines, and by the exclusion of air perature of at least 75° C. for at least 2 hours at atmospheric pressure, discontinuing the heating while the material is still readily soluble in acetone, and removing any unchanged hydrocarbon to obtain an oil having the properties of a drying oil and non-volatile at 100° C.

4. The process of making drying oils which comprises heating a mixture of polymerizable aliphatic hydrocarbons containing at least 2 unsaturated bonds, in the presence of a diluent, to a temperature of at least 75° C. for at least 2 hours at atmospheric pressure, discontinuing the heating while the material is still readily soluble in acetone, and removing any unchanged hydrocarbon.

In testimony whereof I affix my signature.

ARNOLD M. COLLINS.

or by the presence of an inert gas, such as nitrogen or carbon dioxide. In some cases it is more advantageous to discontinue the polymerization when only a portion of the starting material has been converted.

The removal of the unchanged material renders the heat polymerized polymerizable polymer more stable against skinning and solidifying in the container. Any unpolymerized material removed may be used for the manufacture of more synthetic drying oil.

The average molecular weight, viscosity, and solubility of the synthetic drying oils may be controlled by varying the temperature and time of heating. Thus, longer heating yields products of higher molecular weight, greater viscosity, and decreased solubility in such solvents as aliphatic hydrocarbons. Sufficiently long heating will finally cause the gelation or solidification of the entire mass. The gels are insoluble in all solvents and hence not usable as coating compositions. In preparing synthetic drying oils heating must therefore be discontinued before the material reaches the insoluble stage. I have found, however, that non-volatile liquid materials in any stage of polymerization between that represented by an average molecular weight of 156 and that just short of the formation of a gel are suitable for use as synthetic drying oils.

In order that the synthetic drying oils may be used to form the most desirable coating compositions, I may control their flexibility, viscosity, and drying characteristics either during or after polymerization. Thus, the flexibility may be increased by the addition of rubber softeners. The viscosity may be increased by the addition of synthetic resins, like meta styrene, or other viscous, film-forming material which is compatible with the synthetic drying oils, or it may be decreased by dilution with solvents such as xylene, acetone, or butyl acetate in the usual manner or by the addition of small amounts of amines. These synthetic drying oils dry and harden in thin films, without substantial loss of weight (not over 1%), on exposure to air at ordinary or elevated temperatures. The rate at which the films dry may be increased by the addition of driers, such as soluble compounds of lead, cobalt, and manganese. Because of the rapid absorption of oxygen by these synthetic drying oils, it has been found advantageous in some cases to add a small amount of an antioxidant, e. g., eugenol, in order to reduce the tendency to skin and solidify in the container.

The amount of antioxidant used is controlled so that it does not alter the thin film drying rate to an objectionable degree for practical purposes.

It will therefore be apparent that I have developed a new class of non-volatile, soluble drying oils, which may be made synthetically from cheap and readily available substances and a process of producing them. Films of these drying oils dry more rapidly and harder than films containing natural drying oils, and are completely resistant to the action of water, organic solvents, strong acids and alkalies.

No claims are made herein to polymerizable polymers of acetylene containing solid or volatile constituents, other than added diluent, or the process of manufacturing them, inasmuch as this subject matter is disclosed and claimed in a copending application of Julius A. Nieuwland, Serial No. 153,210, filed December 7, 1926.

Likewise, no claims are made herein to the mere prevention of oxidation during the polymerization as this subject matter is disclosed and claimed in a copending application of Calcott and Downing, Serial No. 288,528, filed June 26, 1928.

Furthermore, no claims are made herein to coating compositions containing synthetic drying oils because this subject matter is disclosed and claimed in my copending application Serial No. 384,239.

This application is a division of application Serial No. 384,238, filed August 7, 1929, by the same inventor.

By the term "non-volatile", as used herein, I mean that when heated to 100° C. at a pressure corresponding to 35 mm. of mercury nothing is distilled off.

As many apparent and widely different embodiments of this invention may be made without departing from the spirit and scope thereof, it is to be understood that I do not limit myself to the specific embodiments thereof except as defined in the appended patent claims.

I claim:

1. The process which comprises heating a polymerizable aliphatic hydrocarbon containing at least 2 unsaturated bonds to effect polymerization, discontinuing the heating before the formation of a gel, and while the material is still readily soluble in acetone, and removing any unchanged hydrocarbon to obtain an oil having the properties of a drying oil and non-volatile at 100° C.

2. The process which comprises heating a polymerizable aliphatic hydrocarbon containing at least 2 unsaturated bonds to a temperature of at least 75° C. in the presence of a solvent, discontinuing the heating while the material is still readily soluble in acetone, and removing any unchanged hydrocarbon to obtain an oil having the properties of a drying oil and non-volatile at 100° C.

3. The process which comprises heating a mixture of an added solvent and a polymerizable aliphatic hydrocarbon containing at least 2 unsaturated bonds to effect a degree of polymerization corresponding to that obtainable by heating said mixture to a tem-